United States Patent [19]

Lee

[11] 4,159,445
[45] Jun. 26, 1979

[54] MULTIPLE PURPOSE FEEDBACK CONTROL SYSTEM

[76] Inventor: Yu-Kuang Lee, No. 596, Chung Cheng Rd., Chu Pei, Hsin Chu Hsien, China

[21] Appl. No.: 732,146

[22] Filed: Oct. 13, 1976

[51] Int. Cl.² .............................................. G05B 5/01
[52] U.S. Cl. ................................... 318/614; 318/663; 318/666; 318/673
[58] Field of Search ............... 318/663, 666, 673, 675, 318/349, 511, 514, 612, 614; 192/12 D, 17 C, 18 B

[56] References Cited

U.S. PATENT DOCUMENTS

| | | | |
|---|---|---|---|
| 1,101,938 | 6/1914 | Kinton | 318/349 |
| 1,971,313 | 8/1934 | Johnson | 318/663 |
| 3,239,735 | 3/1966 | Raider et al. | 318/614 |
| 3,628,120 | 12/1971 | Fredriksen | 318/685 |

Primary Examiner—J. V. Truhe
Assistant Examiner—Eugene S. Indyk
Attorney, Agent, or Firm—Burns, Doane, Swecker & Mathis

[57] ABSTRACT

Multiple purpose feedback control system comprising and characterized by a detecting means for detecting the controlled variable and converting the detected variable into a feedback signal output; a signal converting means for receiving the feedback signal from the detecting means and amplifying the signal for input into a balancing motor to convert the signal into rotary displacement in proportion to the said signal; a limit control switch for receiving the rotary movement to compare the movement with a desired value; a pair of electro-magnetic devices for transmission actuated or controlled by the limit control switch at upper and lower limits; a pair of electro-magnetic switches actuated by an on/off solenoid; an electro-magnetic device for braking actuated or controlled by the electro-magnetic switch operated by said control switch; a drive means for driving the main shaft of a control gear means; a control gear set moved by the coupling of the pair of electro-magnetic device and braked by the braking electro-magnetic device; a control gear which serves as the last gear of the said gear set, a variable resistor controlled by the said control gear for corresponding regulation of the controlled variable; and a pair of safety switches.

21 Claims, 20 Drawing Figures

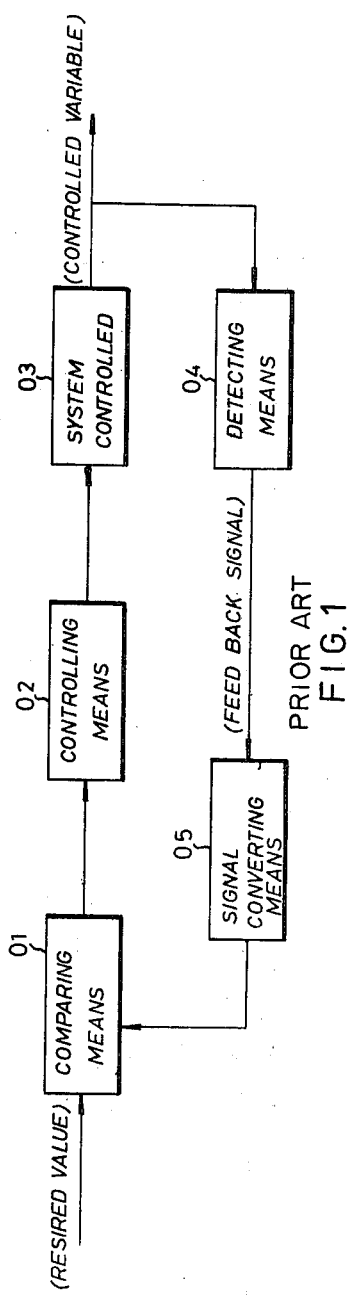
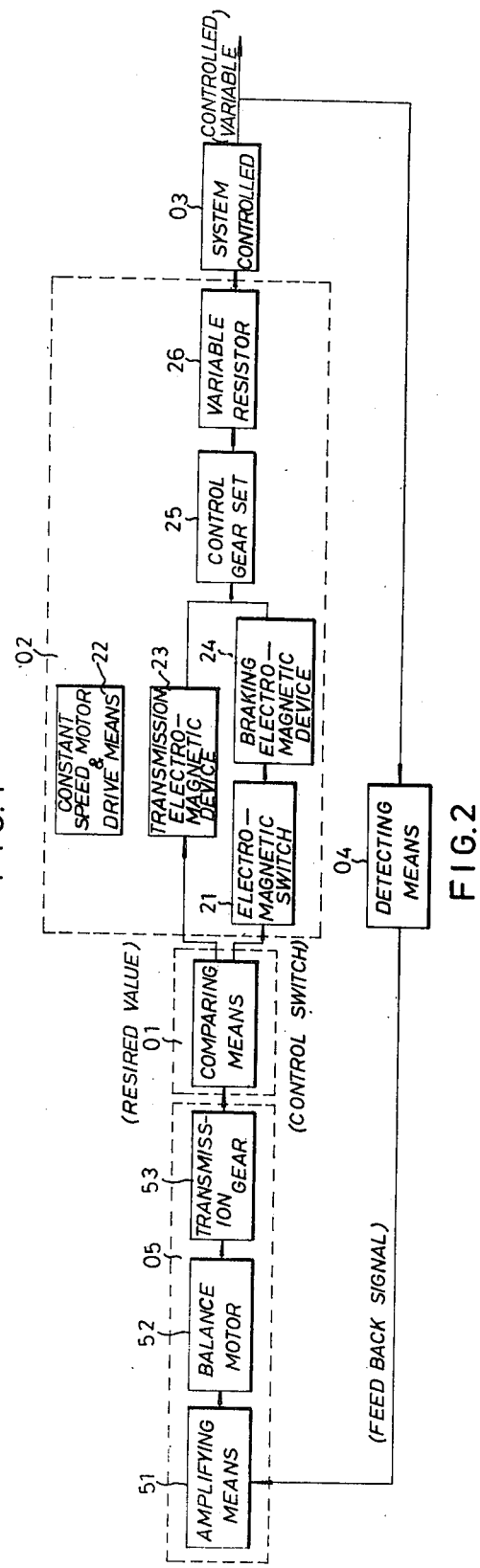

MULTIPLE PURPOSE FEEDBACK CONTROL SYSTEM

FIELD OF INVENTION

The present invention relates generally to a multi-purpose feedback control system, and more particularly to a feedback control system having a balancing motor rotated in proportion to the electric feedback signal received from the system controlled to actuate a control switch having a preset desired value between upper and lower control limits. The control switch controls or actuates pair of electro-magnetic means for transmission, and an electro-magnetic device controlled or actuated by a pair of electro-magnetic switches for braking. A variable resistor for corresponding regulation of the controlled value is driven by a gear set through the electro-magnetic means, to vary correspondingly the current density passed therethrough in accordance with the instruction of a correcting device. This in turn operates a servo-mechanism to regulate the system within a precise and stable automatic regulation or process control.

BACKGROUND OF INVENTION

Many kinds of feedback automatic control or regulating devices have been disclosed, each serving an individual purpose and, due to the different construction they have, their usage is limited. They hardly can cope with the requirements of various automatic regulation and process control called for, and therefore, to meet different purposes, various designs and selections shall have to be provided. It is quite inconvenient both in manufacturing and use. Furthermore, under normal operation these kinds of devices would often give unexpected errors beyond limit, and very often temporary abnormal variations result due to change of load conditions, sometimes due to the slow response, a desired precise and stable control cannot be easily achieved. To overcome the aforementioned drawbacks, a device that is capable of detecting the said error or variation to keep balance within a small range of errors is urgently needed. But the complexity of the improved design usually makes the device hard to operate. In the meantime, the use is still limited, and most of the designs can only serve for the control of small range physical quantities, therefore far from ideal.

SUMMARY OF INVENTION

Therefore, the main object of the present invention is to provide a feedback control system that is capable of being used to control various systems and provides multiple purpose in automatic regulation or process control.

Another object of the present invention is to provide a multipurpose feedback control system, by way of controlling through current intensity variation or servo-motor control to give precise and effective control over physical quantities such as rotation speed, linear speed, torque, force, power, voltage, current, frequency, flow rate, temperature, pressure, liquid level, etc.

A further object of the present invention is to provide a multipurpose feedback control system, with quick response, high precision, excellent stability, which gives a fast and accurate control over a wide range variation of physical quantities. In addition, the alternation of preset desired value can be easily accomplished.

Still another object of the present invention is to provide a multi-purpose feedback control system. Within the feedback control circuit, a limit control switch is provided with a preset desired value which serves as a means for comparison, the said control switch is driven by a balance motor which gives a corresponding rotation displacement in proportion to the strength of the feedback signal received from the system controlled. The said limit control switch controls or actuates a pair of an electro-magnetic device and a braking electro magnet controlled or actuated by a pair of electro-magnetic switches, a mainshaft drive means, a transmission gear set coupled with the electro-magnetic device, a braking gear set actuated or controlled by the braking electro-magnet, a regulating gear formed by the last gear of the said gear set and a variable resistor actuated by the said regulating gear to perform corresponding regulation.

A still further object of the present invention is to provide an electro-mechanical controlled servo-mechanism which is sturdy and durable, easy for use and maintenance, and is capable of being connected with conducting wires to any desirable system controlled to effect remote control, and therefore is versatile, precise and effective.

Other objects and features of the present invention will become apparent through the following detailed description to be taken in conjunction with the annexed drawings.

BRIEF DESCRIPTION OF DRAWINGS

FIG. 1 is a block diagram depicting generally a basic feedback control system;

FIG. 2 is a block diagram depicting the feedback control system of the present invention;

FIG. 16 depicts the use of the system of the present invention for the control of reeling of paper, fabric pieces or the like;

DETAILED DESCRIPTION OF EMBODIMENTS

Figure 3:
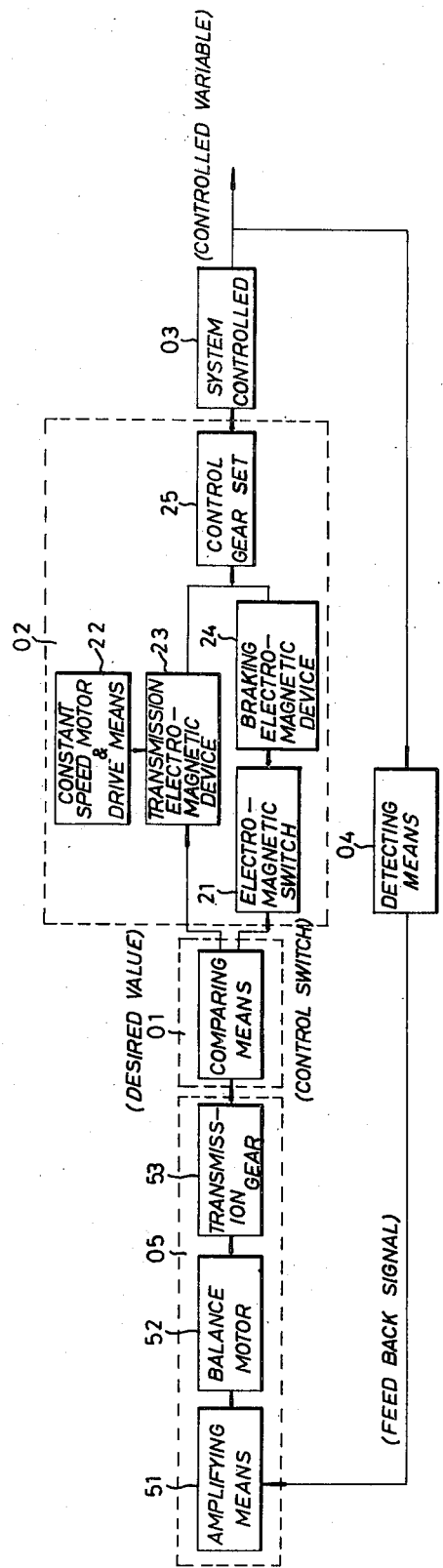
FIG. 3 is a block diagram showing another form of the feedback control system of the present invention.

In FIG. 1, the block diagram shows a general basic feedback control system, wherein, the system comprises a comparing means 01, controlling means 02, the system controlled 03, detecting means 04 and, signal converting means 05. The output quantity from the system controlled 03 is detected in the form of electric current by the detecting means 04, then converted through signal converting means 05 to the required physical quantity and fed back to comparing means 01 to compare with the preset desired value; the difference therefrom is input to the controlling means thereby to control the system controlled 03 and maintain it at a desirable controlled variable.

FIG. 2 depicts the block diagram relating to the present system. The quantity output from the system controlled 03 is detected electrically by detecting means 04 and fedback to the amplifying means 51 of converting means 05, the amplified signal is input to drive the balance motor 52 to convert into the form of rotatary displacement, then through transmission gear 53 to serve as input to the control switch of comparing means 01. After comparison being made with the preset desired value, the difference is again input electrically to controlling means 02. This signal inturn to effects transmission through a pair of transmission electro-magnetic devices 23 which are driven by a motor 22 of constant speed, or brakes the control gear set 25 through the coupling of a braking electro-magnetic device 24, thereby the variable resistor is controlled. As current density passing through the resistor 26 varies, the system controlled 03 is controlled to maintain the controlled variable to meet with the desired value.

In FIG. 3, it is also possible to control, instead of electrically, by way of direct gearing, then the variable resistor 26 may be omitted and utilizing the counter revolving of the last gear of the gear set 25 to control the system controlled 03.

Figure 4:
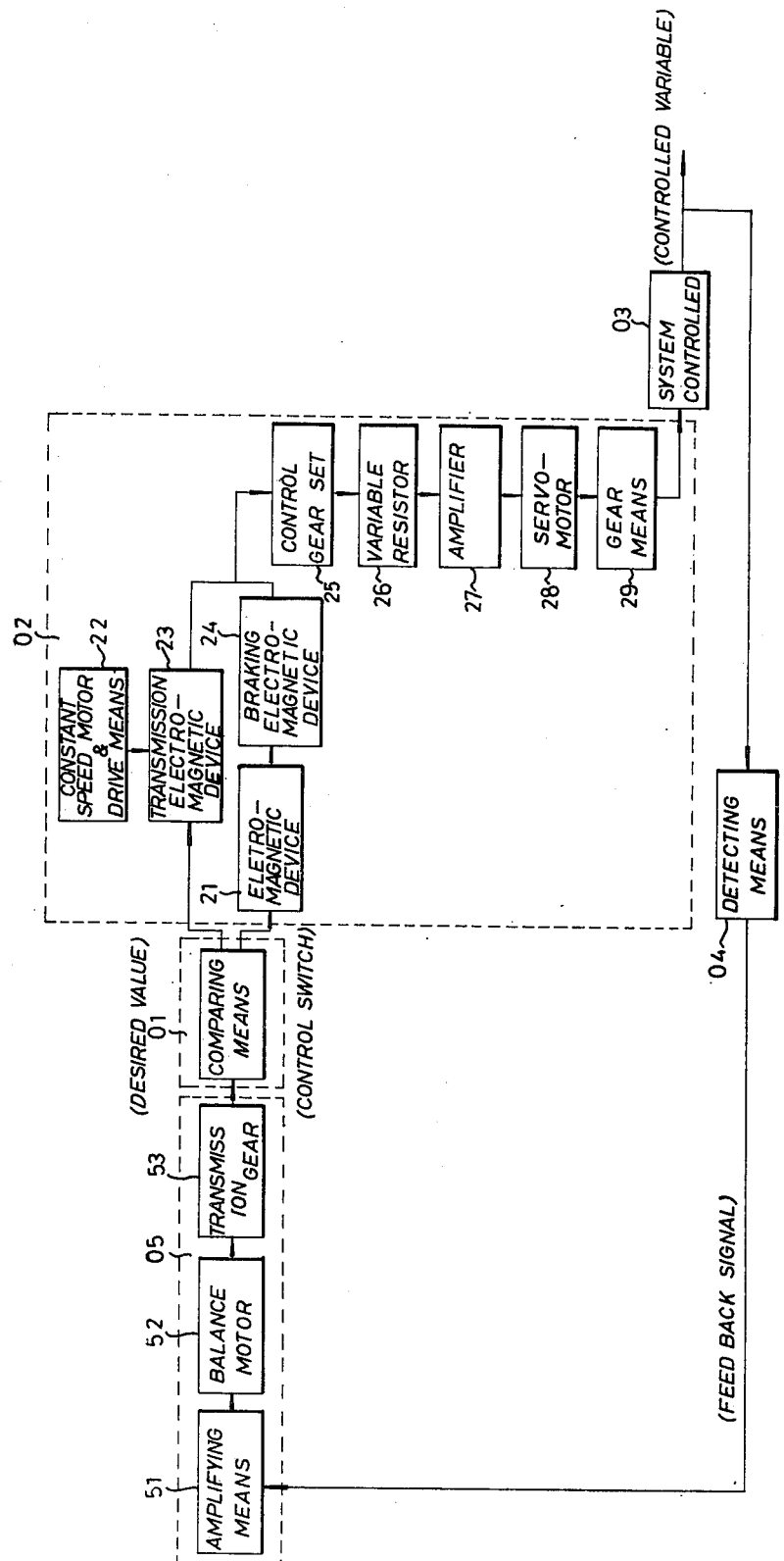
FIG. 4 is a block diagram showing still another form of the feedback control system of the present invention.

In FIG. 4, it is further possible to shunt the current from variable resistor 26 for further amplification through amplifier 27, then input into servo-motor 28 to convert to rotary motion, to control system controlled 03 thru another gear means 29.

Figure 5:
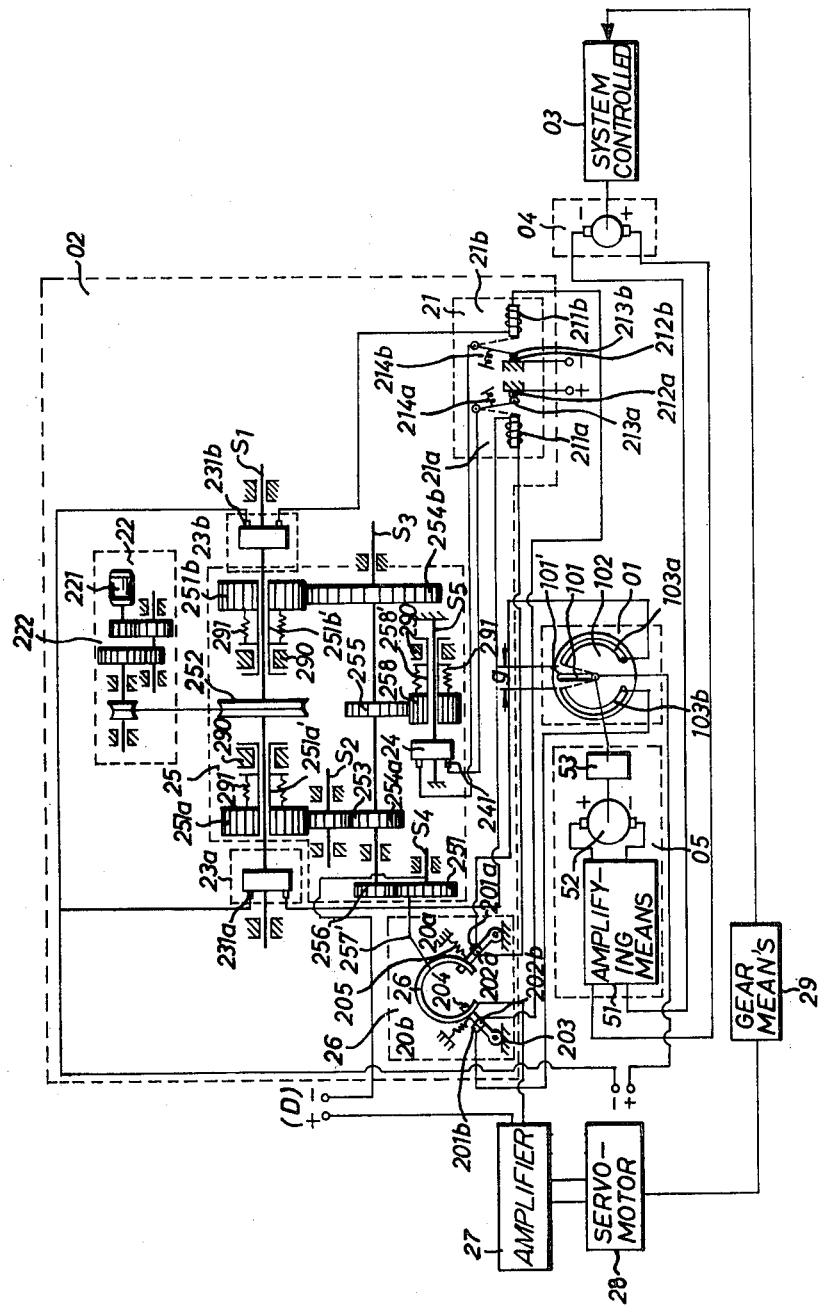
FIG. 5 is a schematic diagram of a preferred embodiment of the feedback control system of the present invention.

FIG. 5 depicts a schematic diagram showing an embodiment corresponding to the block diagram of FIG. 4. In this embodiment, the system is used to control the revolution speed of the system controlled 03, the output quantity of system controlled 03 is provided to be detected by an auxiliary generator or a tachometer 04 connected to the output side of the system controlled 03 and input into the converting means 05 in a form of electric current, after amplified by amplifier 51, to be input to a small balancing motor 52 which rotates corresponding to the detected quantity. Once the motor 52 rotates, it produces torsional torque to drive a movable arm 101 of a limit control switch 01 in the comparing means through reducing gear set 53. The movable arm 101 is caused to give an rotary angular displacement accordingly. The movable arm 101 is a conductor, at the front end of which, contact point 101' composed of such as a spring biased roller is provided which moves with the arm 101 and is capable of sliding freely on and keeping close contact with a pair of semi-circular conductor straps 103a and 103b disposed on a fixed circular insulating plate 102. The pair of straps 103a and 103b having either flat or concave cross section, the gap g between them is an insulating material and having same cross section to facilitate a smooth and continuous movement of the contact point 101'.

Under normal condition when the controlled variable meets with desired value, the movable arm 101' stays at gap g between conductors 103a and 103b. When the controlled variable varies and departs from the desired value, arm 101 under the influence of the servo-motor 52, causes the contact point 101' to depart from the gap g and deviates toward left or right to contact with conductor 103a or 103b, to close a circuit between the control switch 01 and the transmission electro-magnetic clutch 23 which will be described later.

Figure 6:
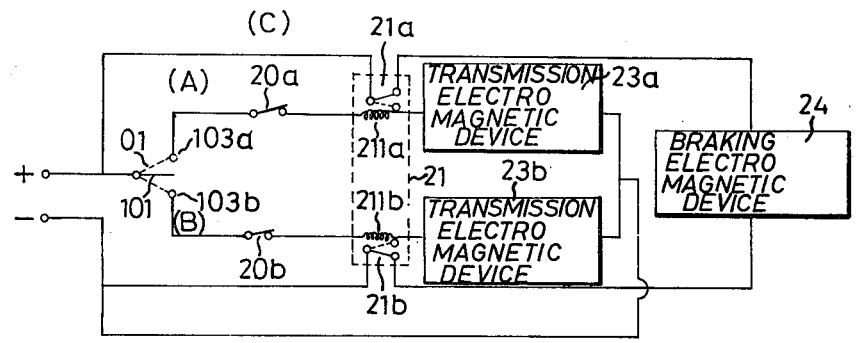
FIG. 6 is a main circuit diagram of the feedback control system of the present invention.

The abovesaid movable arm 101 is led to the positive side of an electric source, the two conductors 103a, 103b being led respectively to one of the safety switch pair 20a-20b connected to the two terminals of the variable resistor 26. The said pair of safety switches having movable contact points 202a, 202b which are disposed respectively at the end of two insulated arm 204–204 pivotally mounted on brackets 203—203, tension springs 205–205 are provided to bias the point 202a, 202b to be in close contact constantly with fix contact points 201a, 201b. The movable contacts 202a, 202b each being connected in series to the input end of a pair of solenoids 211a and 211b of the electro-magnetic switch 21, the output ends of the solenoids are connected to the carbon brushes 231a, 231b of a pair of electro-magnetic clutches 23a and 23b, while the output carbon brushes 231a, 231b are led respectively to the negative side of the same electric source. So that circuit (A) or (B) as shown in FIG. 6 is selectively closed by the movable arm 101, wherein the circuit (A) constitutes:

Positive of source - movable arm 101 - conductor 103a - safety switch 20a - solenoid 211a - electro-magnetic clutch 23a - negative of source the circuit (B) constitutes:

Positive of source - movable arm 101 - conductor 103b - safety switch 20b - solenoid 211b - electro-magnetic clutch 23b - negative of source The abovesaid electro-magnetic switch 21 comprises a pair of switches 21a, 21b constitutes by said solenoids 211a, 211b, fixed contacts 212a, 212b and movable contacts 213a, 213b. When the solenoids 211a, 211b are not energized, through biasing of the springs 214a, 214b, fixed contacts 212a, 212b are kept in normal-close contact condition with movable contacts 213a, 213b. When either of the solenoids is energized, the corresponding movable contact 213a or 213b is attracted to depart from fixed contact 212a or 212b. The said electro-magnetic switch 21 serves to control the applying or releasing of the braking electro-magnet 24. The fixed contacts 212a, 212b are connected respectively to the positive and negative of the electric source, while the movable contacts 213a, 213b are connected to the two terminals 241 of the said electro-magnet 24. Now refer to FIG. 6, wherein the circuit (C) represents the control circuit for electro-magnetic braking device which comprises:

positive of source - switch 21a - electro-magnet 24 - switch 21b - negative of source.

The said electro-magnetic clutch 23 comprises: a pair of electric magnetic transmission clutches 23a, 23b which are fixed on a mainshaft $S_1$ and capable of rotating with the shaft $S_1$ for the transmission of the control gear set 25; the braking electro-magnet is fixed on a fixed shaft $S_5$ for the braking on control gear set 25.

The said control gear set 25 comprises a pair of driving gears 251a, 251b which are slidably mounted on the mainshaft $S_1$; a transmission belt pulley 252 which is fixed on the control section of the mainshaft $S_1$ and serves also as a flywheel; an intermediate gear 253 is fixed on an intermediate shaft $S_2$; a pair of driven gears 254a, 254b are fixed on a driven shaft $S_3$; a gear 255 is fixed on the driven shaft $S_3$; a gear 256 is fixed on one end of the driven shaft $S_3$; a last gear 257 which is in mesh with the gear 256 is fixed on a shaft $S_4$; and a braking gear 258 which is in mesh with gear 255 is slidably mounted on the said fixed shaft $S_5$.

The said control gear set 25 is driven to rotate through belt pulley 252 by a drive means 22 which comprises a constant speed motor 221 and transmission means 222 including gears and a pulley. As the pulley 252 and the clutches 23a, 23b are all fixed on shaft $S_1$, therefore when the pulley 252 starts revolving the mainshaft $S_1$ rotates with clutches 23a, 23b.

Figure 7:
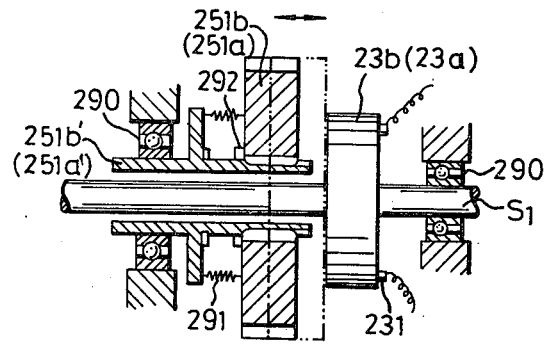
FIG. 7 shows an embodiment of a gear set used in the main control of the feedback control system of the present invention.

From FIG. 7, it may be seen that the driving gears 251a, 251b are slidably mounted on corresponding sleeves 251a', 251b' faced to clutches 23a, 23b, through internal-external splined relationship. The said sleeves 251a', 251b' are loosely mounted on the mainshaft $S_1$ with a clearance and supported by bearings 290 so that they are capable of rotating around shaft $S_1$ individually, however incapable of shifting along the shaft. At a flange on the sleeves 251a', 251b', springs 291 are provided to anchor one side of gears 251a, 251b. Gears 251a, 251b are arranged face to face with respective clutches 23a, 23b and being capable of engaging and disengaging. When the clutch 23a or 23b is not energized, gears 251a, 251b are disengaged with clutches 23a, 23b, when clutch 23a or 23b is energized, the magnetic force causes the engagement of the gear 251a or 251b with clutch 23a or 23b. The friction force between them makes the said gear rotate in the same direction as shaft $S_1$.

Through intermediate gear 253, the driven gear 254a is driven by driving gear 251a and rotates in a same direction as shaft $S_1$. Another driven gear 254b is driven directly by driving gear 251b therefore rotates in a reversed direction as shaft $S_1$. Gear 255 being fixed on the central section of the driven shaft $S_3$, meshes with a braking gear 258 which is mounted on a sleeve 258' loosely mounted on shaft $S_5$ with a clearance and comes face to face with the electro-magnet 24. The sleeve 258' is just like the abovesaid sleeves 251a', 251b' is loosely mounted on shaft $S_5$ with a clearance and supported by bearing 290, being capable to rotate freely yet incapable of shifting along the shaft. On a flange, springs 291 are provided to anchor the braking gear 258 which is mounted on the sleeve 258' in an interal-external splined relationship. So gear 258 is capable to slide freely along the axle direction thereby to engage or disengage the magnet 24. When the electromagnet 24 is not energized, gear 258 meshes with gear 255 and revolves idly on shaft $S_5$. When the magnet 24 is energized, braking gear 258 is attracted by the fixed magnet 24, the friction force happened between them causes the gear 258 to stop rotating. In the meantime, gear 255 which is meshed with gear 258 stops too, the whole gear set 25 ceases rotating.

Gear 256 fixed on the one end of shaft $S_3$ meshes with the last control gear 257 fixed on shaft $S_4$. A contact rod 257' is provided on the said control gear 257. At the end of the rod 257', contact means such as spring biased roller is provided to get in touch with variable resistor 26, when the control gear 257 rotates clockwisely or counter-clockwisely, the contact rod 257' would move along on the resistor 26 accordingly. As result, the current density passing through a circuit (D), i.e., the source - control gear 257 - rod 257' - variable resistor 26 - system controlled 03 - the source varies, that results in a feedback control to the system 03.

Safety switches 20a, 20b are provided at two ends of the variable resistor 26, when the contact rod 257' surpasses the expected moving range for certain reason, in other words, exceeds the preset high-low value of the resistor, the rod 257' would get in touch with the insulated arm 204 to cause the movable contact point 202a or 202b thereon to move against the spring 205 to depart from the fixed point 201a or 201b, thereby open the switch 20a or 20b, the abovesaid clutch control circuit (A) and (B) in turn open while brake control circuit (C) closes, as result, braking magnet 24 works to stop the rotation of the whole system. By that time, the contact rod 257' would stay at switch 20a or 20b and would not pass over any end of the resistor 26 and the whole system has been protected from damage.

The abovesaid situation concerns the direct use of variation electric current density to control the system 03. If servo motor is to be used, just connect the servo motor 28 in series between the electric source and system 03 to convert the variation of current density into rotary motion, then through a gear means 29 to control the system 03. In case the current in circuit (D) is too small, an amplifier 27 may be connected in series before the input to servo motor 28.

The function of the system is detailed hereunder:

Since the controlled variable outputs from the system controlled 03 are being detected by the detecting means 04 and fed back to the converting means 05 in a form of electric current signal, when the controlled variable varies to become higher or lower than the desired value, the signal is amplified by amplifier 51, then input to revolve the balancing motor 52, through reduction gear 53 to move the movable arm 101 of the comparing means 01 and deviate accordingly and get into contact with semi-circular conductor 103a or 103b, thereby closes the circuit (A) or (B). In the meantime, solenoid 211a or 211b is energized to attract movable contact 213a or 213b to depart from the fixed contact 212a or 212b of electro-magnetic switch 21a or 21b and opening. Braking control circuit (C). The engagement of clutch 23a or 23b with gear 251a or 251b drives the whole gear set 25 to rotate, the last control gear 257 in turn moves the contact rod 257' along the resistor 26 to decrease or increase the resistance corresponding to the action of control switch 01. By then, current density in circuit (D) varies accordingly, to resume the controlled variable of system 03 to the desired value, either through the variation of the current density or through the revolution motion of servo-motor 28 or the last control gear 257. When gear set 25 revolves, the gear 258 which meshes with gear 255 is unenergized with the electro-magnet 24 and rotates idly with shaft S₃, and one of the driving gears 251a, 251b also rotates idly.

When the controlled variable resumes to the desired value, through the action of detecting means 04 and signal converting means 05; the movable arm 101 departs from conductor 103a or 103b and returns to the gap g, circuit (A) and (B) open, solenoid 211a and 211b being unenergized, circuit (C) closes due to the contact of movable contact 213a or 213b with fixed contact 212a or 212b, magnet 24 is energized to attract gear 258 to stop rotation by the friction force therebetween. The whole gear set 25 stops since the gear 255 is meshed with gear 258. The resting of contact rod 257' on a specific point on resistor 26 ensures a definite current density in circuit (D), the controlled variable in the system controlled would be maintained with a preset desired value.

From the aforementioned, current density in circuit (D) is kept always at a specific value, and the controlled variable quickly and accurately is varied to maintain it within a narrow range of desired values.

Figure 8:
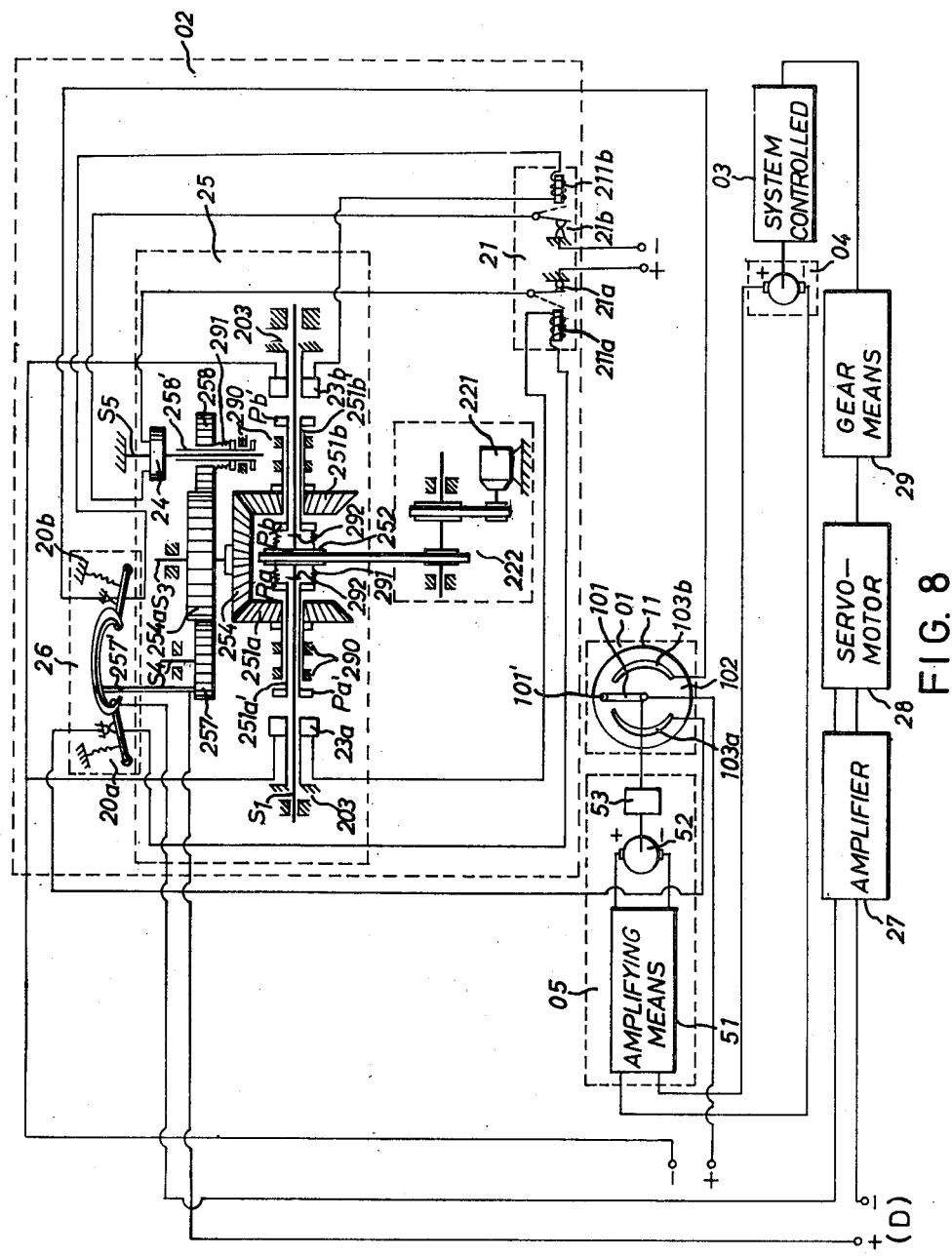
FIG. 8 shows another embodiment of the main control of the feedback control system of the present invention.

FIG. 8 depicts another embodiment of the system of the present invention. In this embodiment, only the electro-magnetic devices 23, 24 and the control gear set 25 in controlling means 02 have some structural difference from the abovesaid embodiment and the circuits and functions thereof remains the the same. Therefore, same numerals are used for the same or corresponding parts, and repetitions of description are also simplified or avoided.

Figure 9:
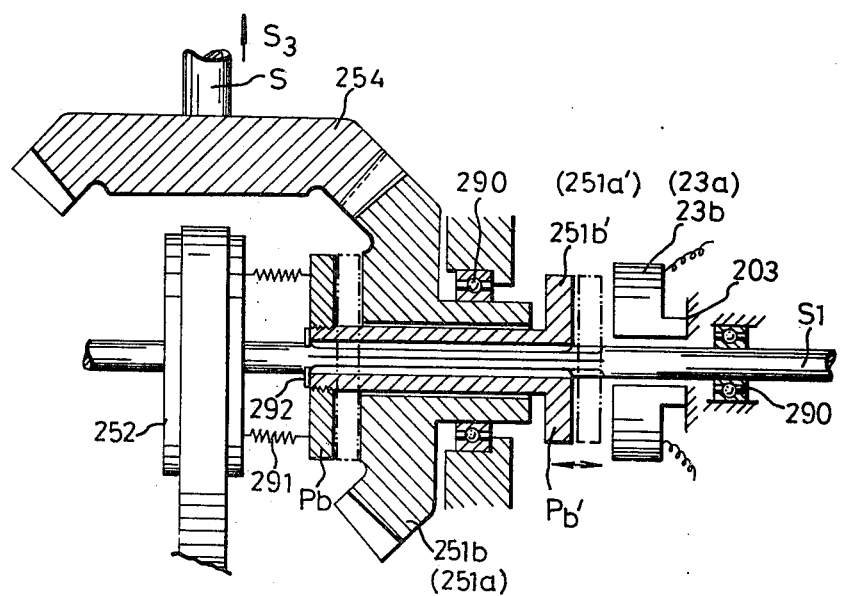
FIG. 9 depicts one of the gear means used in the main control of FIG. 8.

Now referring to FIG. 8 and FIG. 9, on both ends of main shaft S₁, each is loosely mounted an electro-magnet 23a, 23b. These two magnets are fixed on the frame 203. Belt pulley 252 having the effect of a flywheel is fixed on the central section of the main shaft S₁ and driven by motor 221 through transmission set 222 to rotate the shaft S₁ which revolves within the center openings of electro-magnets 23a, 23b. On shaft S₁, adjacent to both sides of pulley 252, sleeves 251a' and 251b' are respectively mounted. At each end of the said sleeves, circular plates Pa, Pa' and Pb, Pb' are provided, to face respectively one side of the pulley 252 and the electro-magnet 23a or 23b. Plates Pa, Pb which are facing toward pulley side are anchored with springs 291 to the pulley 252 and prevent the sleeves from sliding by stoppers 292 disposed on shaft S₁ so that the plates Pa', Pb' would not be able to touch with the hubs of bevel gears 251a, 251b. Circular plates Pa', Pb' which are facing respectively toward magnet 23a, 23b, are slidably mounted on shaft S₁ through internal-external splined relationship so that they would be able to slide freely along the axle direction and rotate with shaft S₁. As the sleeves 251a' and 251b' are formed integrally with plates Pa', Pb', they would rotate with shaft S₁ and slide freely along the splines in axle direction. On the sleeves 251a', 251b', are loosely mounted with two driving bevel gears 251a, 251b a clearance, in which the extended hubs are supported with bearings 290. On top of the bevel gear pair 251a, 251b, is meshed in common a driven bevel gear 254 which is fixed on a shaft S₃. Fixed coaxially with bevel gear 254, is a spur gear 254a which means with a control gear 257 on shaft S₄. A contact rod 257' is fixed on the gear 257, the front end thereof having a contact means to contact with a variable resistor 26. At the other side of gear 254a, a braking gear 258 is meshed therewith. The gear 258 is mounted splinedly on a sleeve 258' which is loosely mounted on a fixed shaft S₅ with a clearance. The flange end of the sleeve 258' is supported on bearing 290 and rotatable freely yet not able to shift along the axle direction. One side of the gear 258 has springs 291 to anchor on the flange 258' and gear 258 could be attracted and released freely by the electromagnet 24.

The controlling means 02 so constructed as abovesaid, the function thereof resembles that of the first embodiment. When control switch closes the circuit (A) or (B), electro-magnet 23a or 23b would attract the circular plate Pa' or Pb' of sleeve 251a' or 251b'. Since the distance between plate Pa' or Pb' and magnet 23a or 23b is larger than that between plate Pa or Pb and gear 251a or 251b, therefore the plate Pa or Pb would contact at the side of gear 251a or 251b, yet plate Pa' or Pb' would keep a distance from the magnet 23a or 23b. The gear 251a or 251b is engaged with plate Pa or Pb of sleeve 251a' or 251b' by friction force there between and rotates with shaft S₁ driven through pulley 252. Thereby the driven gear 254 rotates clockwisely or counter-clockwisely and causes the control gear 257 to rotate, the contact rod 257' inturn gets in touch with and moves along the resistor 26 to vary the resistance, current density in circuit (D) increases or decreases accordingly to effect the feedback control over the system controlled. By then, one of the driving gear 251a or 251b which is not attracted by the electro-magnet, and the braking gear 258 which is meshed with driven gear 254a both revolve idly. When the controlled variable resumes the desired value, circuits (A) and (B) open, and circuit (C) closes, electro-magnet 24 attracts the braking gear 258 to stop the rotation of the whole gear set 25, only pulley 252 and sleeves 251a', 251b' rotate idly with shaft S₁.

The above two embodiment are illustrated based upon block diagram shown in FIG. 4. The control is achieved by varying resistor 26 and through changing of current density for driving servo-motor to control the subject 03. In another embodiment, the variable resistor 26 is omitted, the control is achieved by the rotary motion of the last gear 257, such as shown in the block diagram of FIG. 3. Still another embodiment as shown in the block diagram of FIG. 2, the resistor 26 is maintained, however, both amplifier 27 and servomotor 28 are omitted, and the control is achieved by the variation of current density in circuit (D).

These are two specific features that should be emphasized here. When the control quantity deviates, since the pulley on the main shaft has the effect of a flywheel, instantaneous response therefore becomes possible to give a quick response to make the controlled variable resume to the desired value. Further, the time rate of restoration is also adjustable as desired by adjusting the revolution speed of the constant speed motor or change the gearing ratio of the transmission gear set 222, thereby the displacement rate of contact rod 257' on the variable resistor is capable of being changed. In other words, rate of current change in circuit (D) is changeable, hence the relation between the oscillation and time of response is freely adjustable.

The applications of the system of the present invention are too wide to be named one by one. One of each example of the control over revolution speed, current, voltage, freequency, linear speed, temperature is illustrated hereunder.

Figure 10:
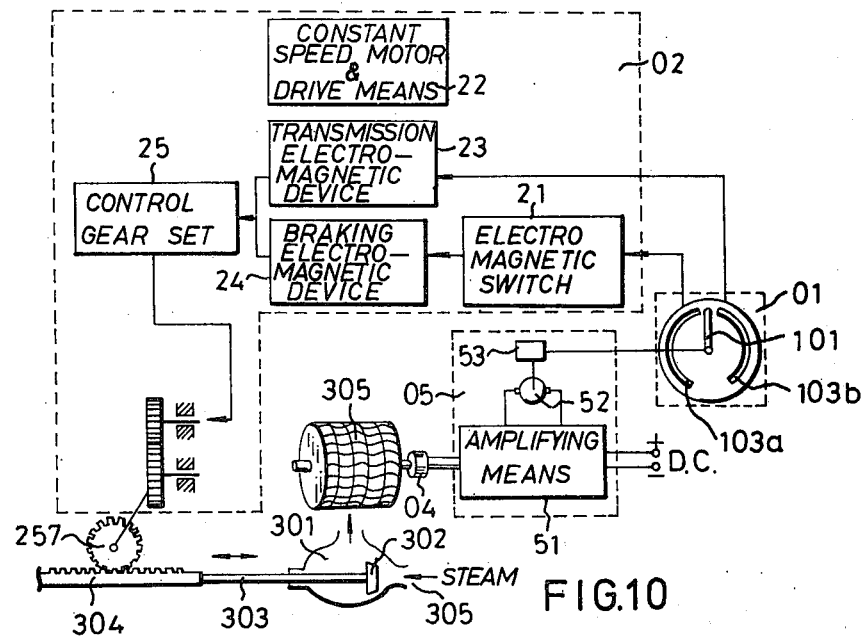
FIG. 10 depicts an application of the system of the present invention in the governor of a steam turbine.

FIG. 10 shows a schematic illustration wherein the system of the present invention is being used for the throttling of a steam turbine. The system controlled 03 is the revolution speed of the turbine. Throttle 301 has a valve 302 with valve stem 303 extending outside the throttle body. A rack 304 is connected to the extension of the stem 303, while the rack 304 is meshed with the last gear 257 of the feedback control system. A small tachometer generator 04 is connected to the output shaft of turbine 305 and revolves together with the turbine shaft, the signal converting means further comprises an amplifier 51, balancing motor 52 and gear means 53. When the revolution speed of the turbine deviates from the desired value, current density from generator 04 varies and the electric signal inputs to the comparison section 01. The signal, after being amplified by amplifier 51, inputs to balancing motor 52, drives the movable arm 101 of control switch 01 through gear means 53, arm 101 in turn deviates accordingly, the final gear 257 responds through electro-magnetic switch 21, clutches 23, 24, gear set 25 of controlling means 02, and moves the rack 304 to open or close the valve 302 to adjust the steam inlet 305, then the revolution speed of the steam turbine is automatically governed. In this example, block diagram in FIG. 3 applies.

Figure 11:
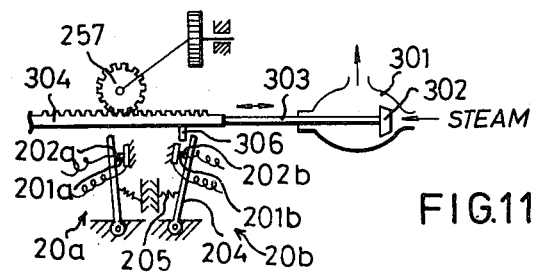
FIG. 11 depicts the use of safety switch of the variable resistor shown in FIG. 5 or FIG. 8 to the application in FIG. 10.

FIG. 11 depicts the use of safety switch 20a, 20b shown in FIG. 5 or FIG. 8 to the application in FIG. 10. At an appropriate position of rack 304, a protrusion 306 is provided, and the safety device 20 is disposed correspondingly, when rack 304 moves under unexpected factors to exceed either of the two limits, the protrusion 306 would touch the corresponding arm 204 and force the arm to move against spring 205, makes the movable contact 202a or 202b depart from fixed contact point 201a or 201b, thereby opens the circuit (A) and (B) and closes the circuit (C), braking magnet 24 is in action to stop the rotation of the whole gear set, the last gear 257 revoles no more, safety of the throttle is ensured.

Figure 12:
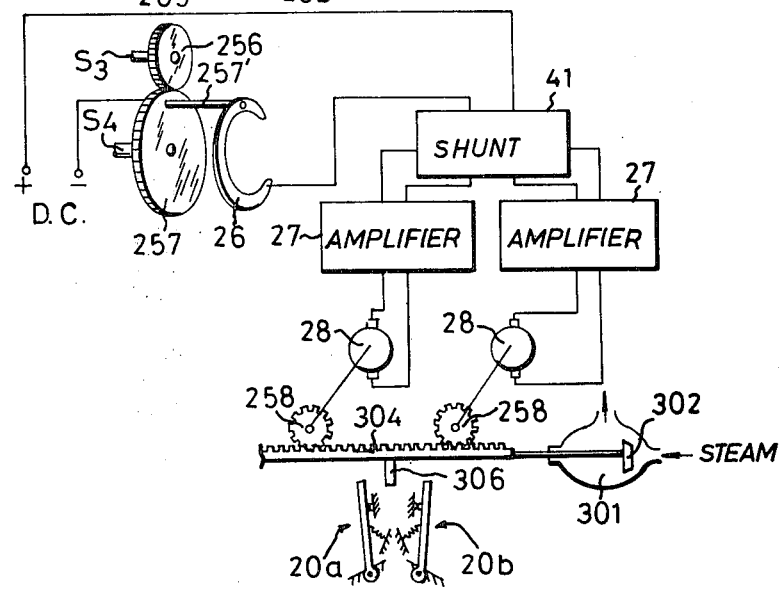
FIG. 12 depicts the use of electric current and a series of servo-motors for the control of a big size steam turbine.

FIG. 12 depicts the control of throttle through servo-motors. Current density after variable resistor 26 is distributed through shunt 41, amplified by amplifier 27, inputs to servo-motors 28 to move gear 258 to drive the rack 304 to accomplish the automatic control of steam outlet from the throttle. This arrangement is more suitable for large size steam turbines where the force required to adjust the throttle is larger. The number of servo-motors may be more or less than two according to the requirement. In this example, block diagram of FIG. 4 applies.

Figure 13:
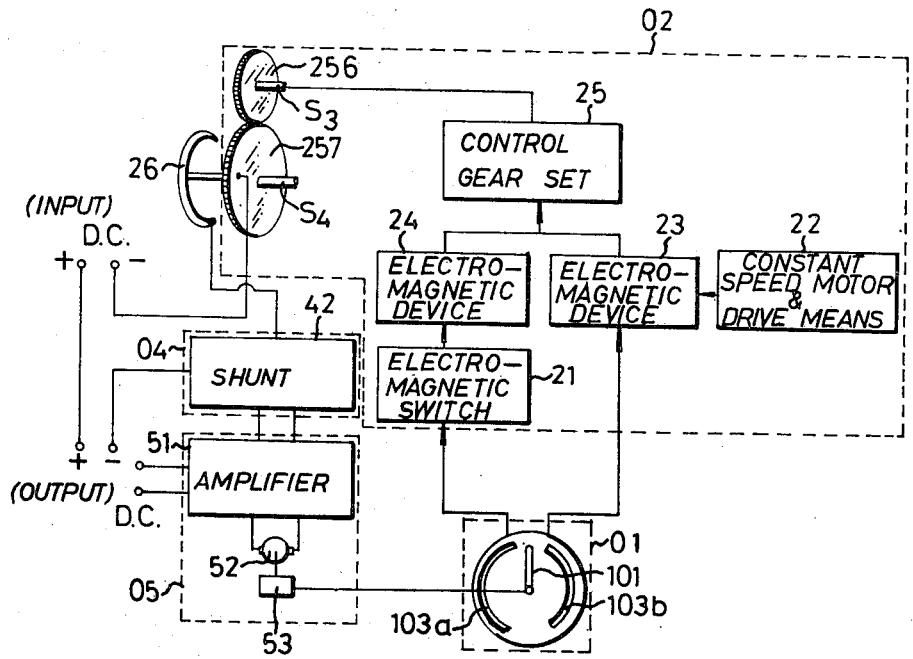
FIG. 13 depicts the use of the system of the present invention for the control of current.

FIG. 13 depicts the application of the system of present invention to the control of current. In this example, the D.C. current is the system controlled. After passing through variable resistor 26, the current is shunted by shunt 42 and inputs to comparing means 01. When the input current density varies and deviates from the desired value, the movable arm 101 which is driven by the amplified signal deviates accordingly. The variable resistor 26 is adjusted through the electro-magnetic switch 21, clutch 23, 24, control gear set 25 of the controlling means 02, to restore the current density to the desired value. In this example, the variable resistor 26 in the controlling means 02 becomes the system controlled, and shunt 42, amplifier 51, balancing motor 52 and gear means 53 become the detecting means 04 and signal converting means 05. With comparing means 01, controlling means 02, in this example, the block diagram of FIG. 2 applies.

Figure 14:
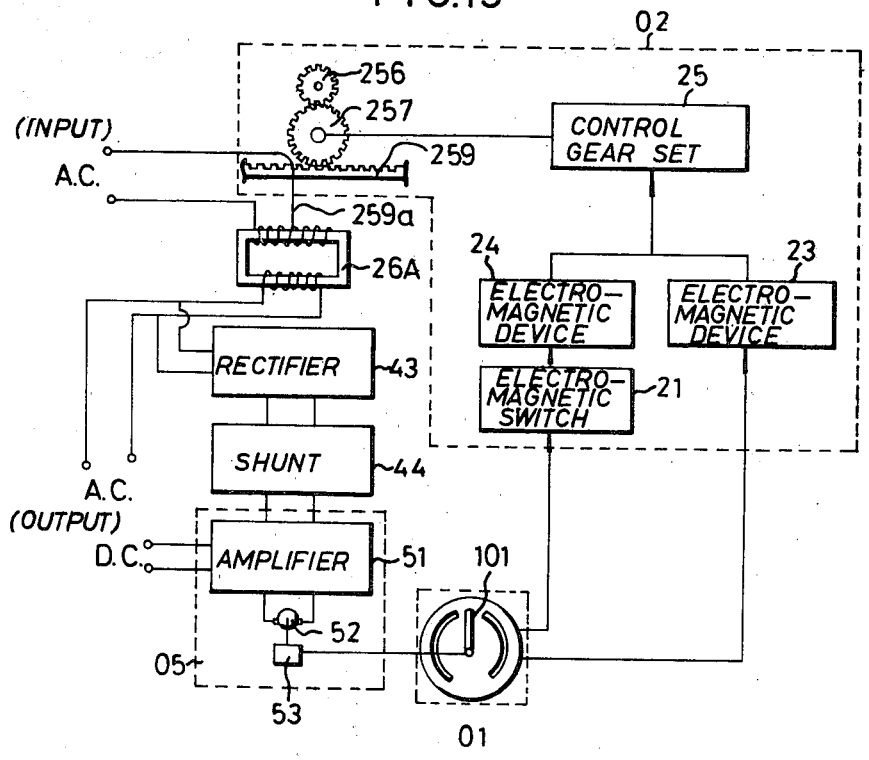
FIG. 14 depicts the use of the system of the present invention for the control of voltage.

FIG. 14 depicts the application of the system of the present invention to the control of voltage. The system controlled, the AC voltage, in the form of electric current, gives a DC signal after passing through rectifier 43, the said signal inputs to signal converting means 05 through shunt 44 to drive movable arm 101 of control switch 01 in the comparing means. Movable arm 101 deviates in response, then through last gear 257 of controlling means 02, to drive the rack 259, actuates contact rod 259a to change the contacting position on variable transformer 26A, thereby changes the output voltage of the transformer, the voltage is thereby regulated to meet with the desired value. In this example, the system controlled is the variable transformer 26A, the detecting means and signal converting means comprise the rectifier 43, shunt 44, amplifier 51, balancing motor 52, gear means 53, with comparing means 01, controlling means 02, the block diagram FIG. 2 applies.

Figure 15:
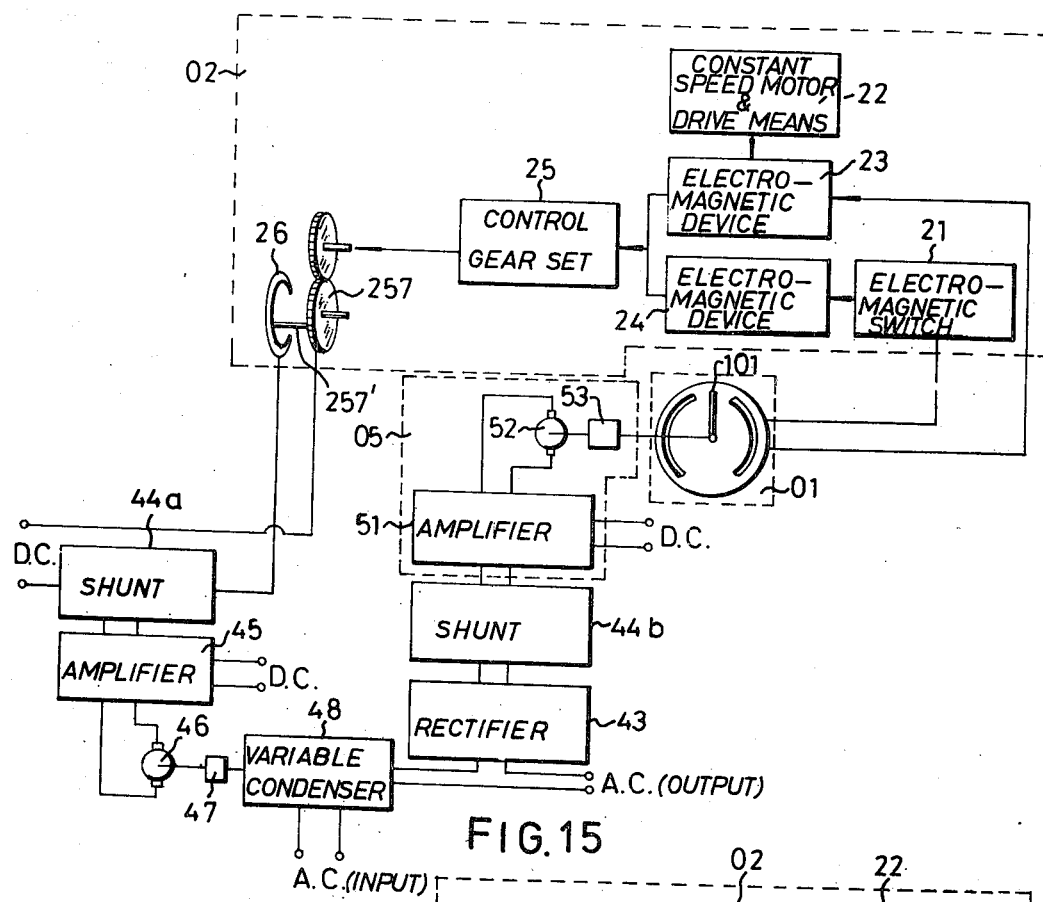
FIG. 15 depicts the use of the system of the present invention for the control of fequency.

FIG. 15 depicts the application of the system of the present invention to the control of frequency. In the drawing, 43 denotes the rectifier, 44a and 44b being the shunts, 51 and 45 the amplifiers, 52 and 46 the servo-motors, 53 and 47 the gear transmission, 48 being the variable condenser. When the frequency of the input AC varies, current density changes accordingly. The current after rectifier 43, becomes DC, then passes through shunt 44b, amplifier 51, balancing motor 52, gear transmission 53 in the signal converting means 05 to convert into the form of angular displacement, inputs to comparing means 01 to control the controlling means 02. Wherein the contact rod 257' moves on variable resistor 26. DC from there flows through shunt 44a, amplifier 45, servo-motor 46, gear means 47 to drive variable condenser 48 to regulate its capacitance, thereby automatically adjusts the frequency of AC output to meet with the desired value. In this example, the variable condenser 48 is the system controlled. The detecting means and converting means comprise the rectifier 43, shunt 44b, amplifier 51, balancing motor 52, gear means 53. With comparing means 01, controlling means 02, the block diagram in FIG. 4 applies.

Figure 16:
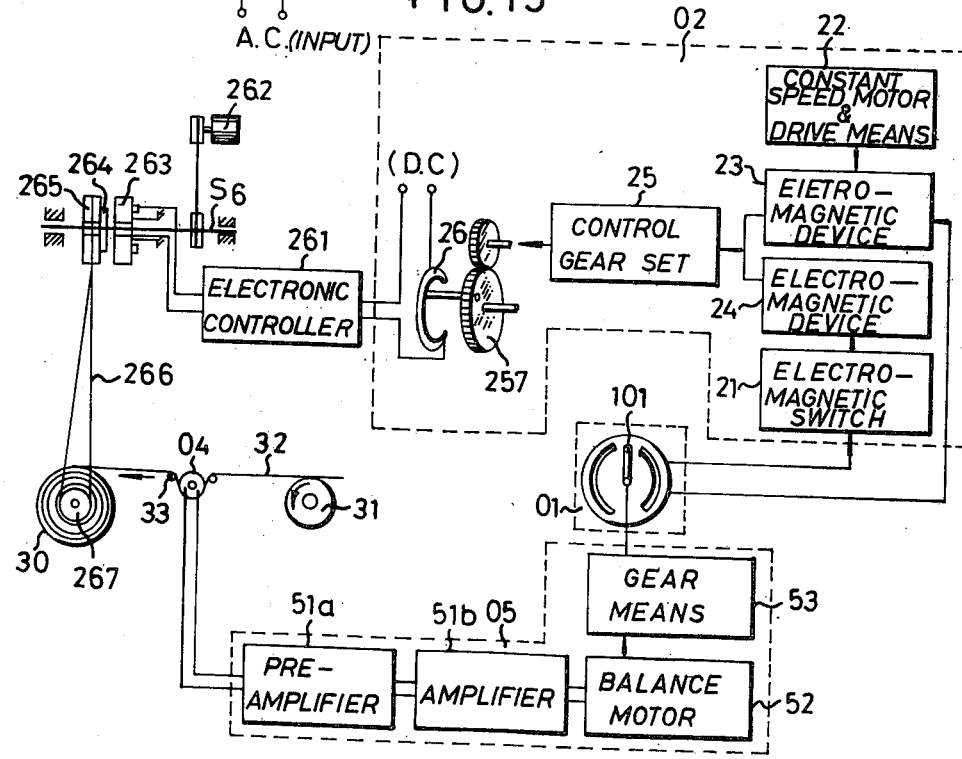

FIG. 16 depicts the application of the system of the present invention to the speed control in the reeling of paper, fabric pieces or the like. In the drawing, the system controlled is the reeling roller 30, with paper or fabric 32 and feed roller 31, the small tachometer generator 04 being the detecting means, and guide roller 33. The signal converting means 05 comprises a pre-amplifier 51a, amplifier 51b, balancing motor 52 and gear means 53. In the controlling means 02, having variable resistor 26, last control gear 257, associated with an electronic controller 261, a shaft $S_6$ is driven by a constant speed motor 262. Fixed on shaft $S_6$ and rotated therewith is an electro-magnetic clutch 263. A magnetic conductive disc 264 which is formed integrally with the belt pulley 265, is slidably mounted on the shaft $S_6$ and rotates freely. Belt 266 and driven pulley 267 to complete the transmission the reeling roller 30. In this system, the paper or fabric is desired to be reeled up in a constant linear speed, not too tight, not too loose so that the quality would not be jeopardized. When reeling roller 30 starts reeling, the linear speed is comparatively lower. As the reel diameter increases, if the roller 30 keeps on reeling with same rpm, would force the feed in a quicker and quicker speed and the feed roller 31 would not be able to follow, therefore the control becomes necessary. By then, the feedback signal is produced from the small tachometer generator 04 which is driven directly by the material in reeling, after amplifiers 51a, 51b, the signal is input into motor 52 which would actuate the movable arm 101 of the control switch 01 through gear means 53 to act accordingly. By way of controlling means 02, electronic controller 261, current density input to magnet clutch 263 is adjusted to vary the attraction force toward disc 264, thereby the speed of reeling roller 30 through the transmission of pulley 265, belt 266, pulley 267 is regulated, and automatically adjusts the linear speed of reeling to meet with the preset desired value. In this example, the block diagram of FIG. 2 applies.

Figure 17:
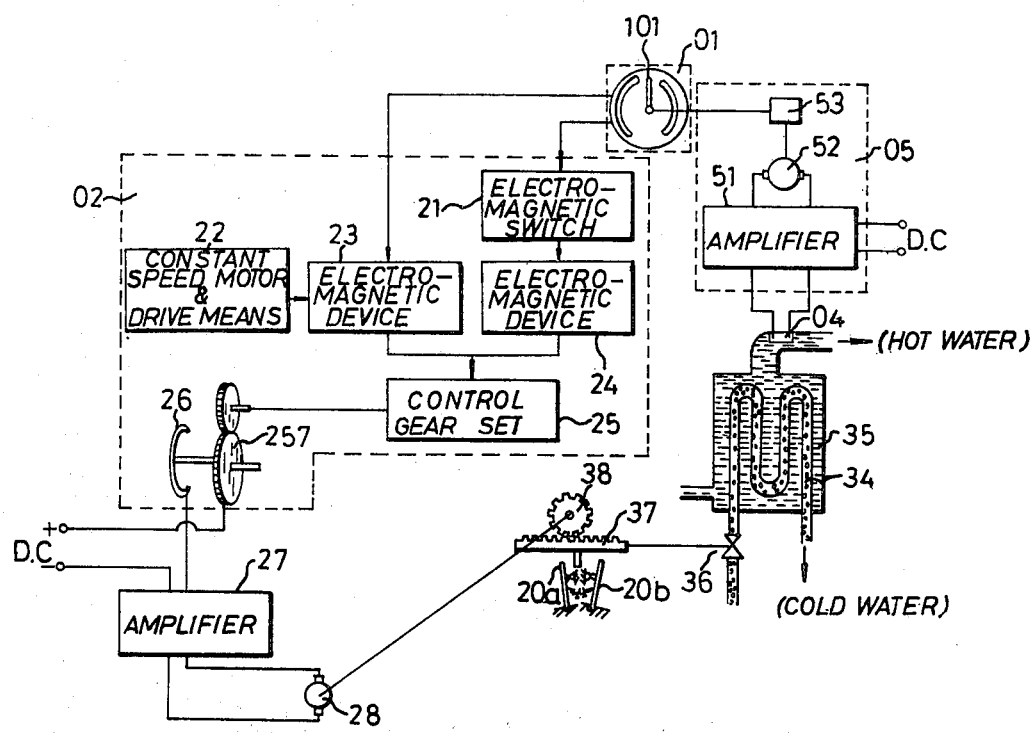
FIG. 17 depicts the use of the system of the present invention for the control of temperature.

FIG. 17 depicts the application of the system of the present invention to the control of temperature. In the drawing the numerals denote respectively: 34 for heat exchanger, 35 for steam regulating valve box, 36 for regulating valve, 37 the rack, 38 the gear, 28 being servo-motor, 27 the amplifier, 26 the variable resistor, 04 for the potentiometer and thermo-couple in the temperature detecting means, 05 the signal converting means, 01 the comparing means, and 02 the controlling means. Temperature of hot water discharged from heat exchanger 34 as detected by the thermo-couple and potentiometer is converted to electrical signal, then inputs into the signal converting means 05 to become a form of angular displacement to move the movable arm 101 in the comparing means 01. Current is controlled through control means 02, after amplified by amplifier 27 to move the driving rack 37 through servo-motor and gear 38, thereby controls the valve 36 to regulate the steam inlet to assure the temperature of hot water discharged from the heat exchanger 34 to a desired value. In this example, the block diagram in FIG. 4 applies.

Figure 18:
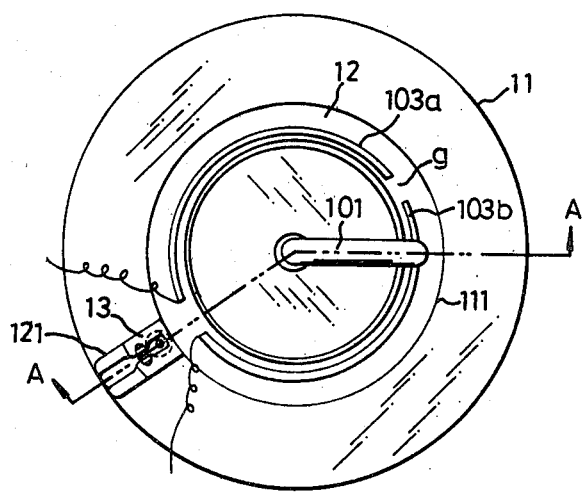
FIG. 18 is a top view showing an embodiment of an adjustable control switch means.
Figure 19:
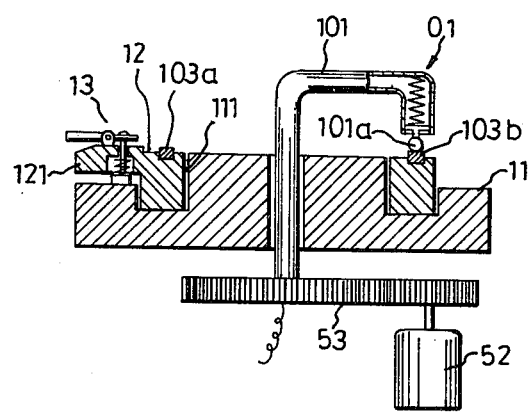
FIG. 19 is a cross sectional view thru A—A line in FIG. 18.

FIG. 18 and FIG. 19 show another embodiment of the control switch 01 of the present invention. This embodiment aims at the provision of the selective setting of a desired value. In other words, in the aforementioned embodiments, the desired value as preset is a constant, now the said value can be variable. Referring to the drawing, the control switch comprises: a fixed circular plate 11 with a ring groove 111 on the top, a movable arm 101 having spring biased contact 101a at its front end, a movable disc 12 having a turnable handle 121 provided at the appropriate position on the circumference, and a pair of semi-circular conductors 103a, 103b inserted thereon. On the turnable handle 121 a setting means 13 is provided to be able to set the disc 12 at any desired position on plate 11 thereby the user can turn the disc 12 to any desired angle (usually ±90°) to select the upper and lower control value. The control range and the practical value is therefore greatly increased. Furthermore, the said improvement may be used in the program control where the desired value varies constantly with time. Application is also possible in the automatic follow-up control where the desired value varies irregularly depending on another physical quantity. The disc 12 is capable of being constructed to automatically change the angular displacement according to the requirement of program control or follow-up control.

Figure 20:
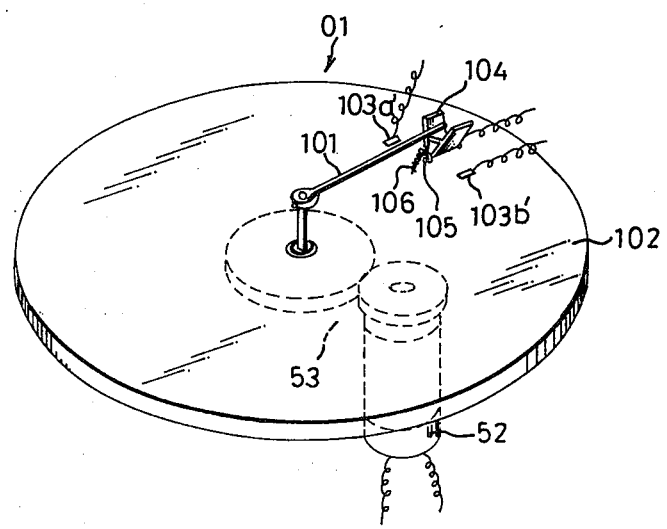
FIG. 20 is another embodiment of the contact part of a control switch.

FIG. 20 depicts another embodiment of the contact point of the control switch 01 in the present invention. Referring to the drawing, on the circular plate 102, only two contact points 103a' and 103b' are disposed at a certain distance from each other. A V shaped conductor 104 swingable upon a pivot 105 is provided between the said two contact points. A spring 106 serves to anchor the conductor 104. A movable arm 101 with insulated tip is placed between the V notch. when arm 101 moves to either direction, the conductor 104 is forced and biased to fall upon the corresponding contact point 103a' or 103b' to close the switch 01.

Having the construction and utilization as abovesaid, the present invention is capable of controlling revolution speed, linear speed, torque, force, power, voltage, current, frequency, flow rate, temperature, pressure, liquid level, etc. precisely and effectively through electrical or mechanical means, to meet with desired design value. It is also possible to effect remote control to any desired system. It is easy to operate, easy to maintain, having excellent stability, being sturdy and durable. Especially the quick response and high precision, versatility in application make this invention incomparable.

The above embodiments serve only for illustration and not by way of limitation. Modifications shall be evident to those skilled in the art without departure from the spirit of the present invention, and shall be considered to be covered by the scope of attached claims.

I claim:

1. Multi-purpose feedback control system comprising:

a detecting means for detecting a controlled variable and converting the detected variable to an electrical feedback output signal;

a signal converting means for receiving the said electrical feedback signal and converting said feedback signal into a form of angular or rotary displacement in proportion to the strength of said signal;

a limit control switch having a movable arm which is rotated in accordance with said rotary displacement and a pair of contacts to compare said displacement with a preset desired value;

a pair of transmission electro-magnetic devices which are controlled by said limit control switch according to upper and lower limits;

pair of electro-magnetic switches actuated through energizing and de-energizing of a pair of solenoids in accordance with the actuation of said transmission electro-magnetic devices;

a braking electro-magnetic device controlled by said control switch through the action of said electro-magnetic switches;

a set of drive means for driving a mainshaft of control gear means;

a control gear set adapted to rotate through the actuation of said transmission electro-magnetic devices and to automatically effect braking through energizing of the braking electro-magnetic device when said transmission electro-magnetic devices are de-energized;

a last control gear controlled by said control gear set;

a variable resistor controlled by said last control gear and performing corresponding adjustment of the controlled variable; and a pair of safety switches to limit adjustment of said variable resistor.

2. Feedback control system according to claim 1 wherein the limit control switch serves as the comparing means of the system; and the said transmission electro-magnetic means, the electro-magnetic switch, the braking electro-magnetic device, and mainshaft drive means, the control gear set, the last control gear, the variable resistor and the safety switches constitute a main controlling means; and the main controlling means controls the rotary direction and angular displacement of the last control gear in accordance with the variation in an output signal of the comparing means, and thereby controls the resistance of the variable resistor to cause the system controlled to meet with the desired value.

3. Feedback control system according to claim 2, wherein the limit control switch serves as a comparing means comprising a fixed insulation circular plate,
- a movable arm disposed through the center opening of said plate and driven by a balancing motor of the signal converting means through gear means and capable of making angular movement in either direction,
- said arm including a contact means leading to an electric source which contact means is able to make an arc movement on and along a pair of semi-circular conductors disposed on the insulation plate between which an insulation gap is provided, whereby when the controlled variable meets with the desired value the contact means at the arm end rests in said gap and the circuit between the control switch and the main controlling means is open; and when the controlled variable departs from the desired value, said arm is driven by the balancing motor to come in contact with either of the two semi-circular conductors to close the circuit between the control switch and the main controlling means.

4. Feedback control system according to claim 2, wherein said limit control switch comprises:
- a fixed insulation circular plate,
- an insulated movable arm, a V shaped conductor,
- a gap formed according to the upper and lower limits set by the desired value on said plate along the arc of travel of said arm wherein said V shaped conductor is pivotally mounted in the middle of said gap, and a contact point is provided at each end of the gap, whereby the front end of said arm is placed between the V notch and when the movable arm rests in the gap, the V shaped conductor stands upright without contacting either of the contact points and the circuit between the control switch and the main controlled means is open, and when the movable arm deviates through the driving of said balancing motor, said arm swings over to such an extent as to force the V shaped conductor to fall by its own weight or under the influence of a spring to touch with one of the two contact points, and cause the closing of the circuit between the control switch and the main controlling means.

5. Feedback control system according to claim 1, wherein said control switch comprises a fixed circular insulation plate having a center opening and a ring groove, a movable disc inserted in the said groove and turnable freely therein,
- a pair of semi-circular conductors symmetrically disposed on the disc,
- a turning handle disposed at an appropriate position on the circumference of the disc, and
- a setting means on said handle to set the disc on the plate at any desired angle.

6. Feedback control system according to claim 1, wherein a circuit is provided between the control switch and the main controlling means,
said circuit comprising;
- a lead from a terminal of an electric source to the input terminal of said control switch, further including two output terminals of said control switch corresponding to the positive and negative deviation of the movable arm, each said terminal being connected in series to a safety switch, a solenoid and a transmission electro-magnetic device, and hence to the other terminal of the course, to constitute and pair of parallel transmission electro-magnetic control circuits selectable by the movable arm;
- and further including, in parallel with said pair of circuits,
- a circuit which connects in series a braking electro-magnetic device which includes a pair of electro-magnetic switches actuated by said pair of solenoids in said parallel transmission circuits, whereby when said control switch is in a neutral position, the braking control circuit is closed,
- and when the input terminal of the control switch contacts either of the output terminals,
- the corresponding parallel transmission circuit is closed, and the braking control circuit opens as a result of the opening of one of the electro-magnetic switches actuated by solenoid in said parallel transmission circuits.

7. Feedback control system according to claim 6, wherein the input terminal of the control switch in said circuit between the control switch and the main controlling means is a contact means at front end of a movable arm or a V shaped conductor moved by an insulated movable arm, and the output terminals of said switch are two symmetrically disposed semi-circular conductors or two contact points.

8. Feedback control system according to claim 6, wherein the pair of transmission electromagnetic devices are disposed at two ends of the main shaft of the control gear set and when one of said transmission circuits is closed, the electro-magnetic device corresponding to said circuit attracts the control gear set to drive the driven shaft to rotate in one direction, and when the other circuit is closed, the driven shaft rotates in the reverse direction.

9. Feedback control system according to claim 6, wherein the braking electro-magnetic device is fixed on a fixed shaft in parallel to the driven shaft in said control gear means and when the braking control circuit is closed, the braking electro-magnetic device is energized to stop the rotation of the whole control gear set.

10. Feedback control system according to claim 1, wherein the control gear set comprises, a flywheel driven by a constant speed motor through transmission means such as gears or belt-pulley, a pair of driving gears mounted on the flywheel-driven main shaft and a rotatable there-with through the coupling or engagement of the said transmission electro-magnetic clutch, a driven gear fixed on the driven shaft and being meshed directly with one of the driving gears and capable of causing the driven shaft to rotate in the opposite direction with the driving shaft, another driven gear fixed on the driven shaft and through an intermediate gear to mesh with another driving gear and capable of causing the driven shaft to rotate in the same direction as the driving shaft, a gear fixed on the driven shaft, yet in mesh with the braking gear which is mounted on a fixed shaft capable of causing the stop of rotation of the whole gear set by the actuation of the braking electromagnet through the gear meshed with the braking gear, and a last control gear transmitted by the driven shaft.

11. Feedback control system according to claim 10, wherein the main shaft of the control gear is driven by the flywheel,
- a pair of transmission electro-magnetic clutches are fixed at the two ends of the main shaft and rotate therewith, a pair of driving gears are mounted on the main shaft through a pair of sleeves and facing toward the transmission electro-magnetic clutch, said gears being slidably mounted on the sleeves through internal-external splined relationship, one end of said sleeve is supported on a bearing and capable of revolving with the driving gear and loosely mounted on the main shaft with a clearance yet incapable of shifting along the shaft, and anchoring means are located between the driving gear and the sleeve flange, whereby when one of the driving gears is attracted by the corresponding energized transmission electro-magnetic clutch, said gear shifts along the sleeve in axle direction and couples or engages with the electro-magnetic clutch to rotate with the main shaft and thereby drive the driven shaft through mesh of gears.

12. Feedback control system according to claim 10, wherein the driven shaft of the control gear set is driven to rotate either in the opposite direction to the driving shaft through direct meshing with a driving gear coupled with one of the transmission electro-magnetic clutches or in the same direction as the driving shaft through an intermediate gear meshed to the other driving gear coupled with the other transmission electro-magnetic clutch;

the braking gear being mounted on a fixed shaft in parallel with the driven shaft through a sleeve and facing the braking electro-magnet, and meshing with a gear fixed on the driven shaft, said braking gear being slidable freely on said sleeve through internal-external splined relationship, one end of the sleeve being supported on a bearing and rotatable freely mounted on the fixed shaft with a clearance, yet incapable of shifting in axle direction, and between the braking gear and the sleeve flange, anchor springs are provided, whereby when the braking gear is attracted by the energized braking electro-magnet, the braking gear shifts along the sleeve and engages said electro-magnet, forcing the whole gear set to stop rotation through meshing with the gear fixed on the driven shaft.

13. Feedback control system according to claim 1, wherein the last control gear is either directly fitted on the driven shaft or transmitted by the driven shaft and able to rotate in one direction or in the reverse direction, and a conducting rod is provided on said last gear, the front end of the rod being in contact with the variable resistor and varying its position of contact in accordance with the rotary movement of said last gear, thereby varying the resistance value of said resistor.

14. Feedback control system according to claim 13, wherein two safety switches are provided at two ends of the variable resistor in the main control means such that when the contact rod of the last control gear surpasses either end, one of the safety switches is opened, and said transmission control circuits are opened, and said braking control circuits closes, thereby stopping the rotation of the whole control gear set.

15. Feedback control system according to claim 1, wherein the control gear set in the main controlling means includes bevel gears.

16. Feedback control system according to claim 15, wherein the bevel type of control gear set comprises:

a flywheel driven by a constant speed motor through transmission means such as gears or belt and pulley, a mainshaft driven by the flywheel, a pair of driving bevel gears mounted on the main shaft through a pair of sleeves and facing toward a pair of transmission electro-magnets, said driving bevel gears each being disposed at one side of the flywheel and capable of rotating with the main shaft through frictional engagement with the corresponding sleeve which is capable of being attracted by the energized transmission electro-magnet, a driven bevel gear fixed on a driven shaft vertical to the main shaft and meshed in common with the two driving bevel gears, a spur gear fixed on the driven shaft, a braking gear meshed with said spur gear and capable of stopping the rotation of the whole control gear set through the action of the braking electro-magnet, and a last control gear also meshed with said spur gear.

17. Feedback control system according to claim 16, wherein the pair of sleeves is slidably mounted on the main shaft with internal-external splined relationship and rotatable with the main shaft and at both ends of each sleeve, a circular plate is provided, one plate adjacent to the flywheel being anchored with springs to the flywheel, another plate facing toward the transmission electro-magnet and apart at a certain distance, further including a pair of driving gears each loosely mounted on the sleeves with a clearance between the two end plates and supported by a bearing, and, on the main shaft between the sleeves and flywheel, stoppers to prevent the attaching of said sleeves to the flywheel, whereby when a transmission electro-magnet is energized to attract the end plate of a sleeve, the other end plate of the sleeve presses against the side of the driving gear, causing the driving gear to be frictionally associated with the sleeve to rotate with the main shaft, thereby driving the driven gear.

18. Feedback control system according to claim 16, wherein said driven gear which is transmitted by the pair of driving gears rotates in one direction or in the reverse direction through the energizing of said transmission electro-magnets, and on the driven shaft a spur gear is provided, a braking gear is meshed with said spur gear and is slidably mounted on a sleeve which is loosely mounted on a fixed shaft with a clearance, the braking gear being capable of sliding freely on the sleeve through internal-external splined relationship between them, one end of said sleeve being supported on a bearing and rotatable yet incapable of shifting in axle direction, and anchoring springs provided between the braking gear and the supporting side flange of the sleeve, whereby when a fixed braking electro-magnet facing the braking gear is energized, said gear is attracted to stop the rotation of the whole control gear set.

19. Feedback control system according to claim 16, wherein the last control gear meshed with the spur gear on the driven shaft has a control rod which moves along a circular track following the last gear and a contact means at its front end to contact the variable resistor.

20. Feedback control system according to claim 1, wherein the safety switch in the main controlling means is moved to provide at an appropriate location of the system controlled a cut-off of the electric source during operation when the detected value surpasses the preset range of control.

21. Multi-purpose feedback control system comprising a detecting means for detecting the control quantity of a controlled system and converting said detected quantity to an electrical feedback signal, a converting means for receiving the feedback signal from the detecting means and amplifying said signal for input to a balancing motor to perform corresponding rotary displacement in proportion to the strength of the feedback signal, a control switch for receiving the converted rotary movement and comparing said movement with a desired value, a pair of transmission electro-magnetic devices acting according to the control of upper and lower limits of the control switch, a pair of electro-magnetic switches actuated in accordance with the actuation of solenoids associated with the control circuit of the transmission electro-magnetic means, a braking electro-magnetic device controlled by the control of said control switch through electro-magnetic switches, a drive means for driving the main shaft of the gear means, a control gear set rotated through the coupling of said pair of transmission electro-magnetic devices and stopped by the automatic energization of the braking electro-magnetic device, and a last control gear for the control gear set and a safety switch for limiting movement of said last control gear.

* * * * *

UNITED STATES PATENT AND TRADEMARK OFFICE
CERTIFICATE OF CORRECTION

PATENT NO. : 4,159,445
DATED : June 26, 1979
INVENTOR(S) : Yu-Kuang Lee

It is certified that error appears in the above-identified patent and that said Letters Patent are hereby corrected as shown below:

In the drawings, Sheet 1, Fig. 1, the input signal to the comparing means 01 should be labeled "DESIRED VALUE";

Sheet 1, Fig. 2, the input signal to the comparing means 01 should be labeled "DESIRED VALUE";

Sheet 4, Fig. 5, the lead line for the reference numeral 253 should refer to the intermediate gear rotating on the shaft S2.

Signed and Sealed this

*Thirteenth* Day of *November 1979*

[SEAL]

Attest:

RUTH C. MASON
*Attesting Officer*

LUTRELLE F. PARKER
*Acting Commissioner of Patents and Trademarks*